United States Patent [19]

Philip et al.

[11] Patent Number: 4,794,644
[45] Date of Patent: Dec. 27, 1988

[54] METHOD OF SECURED COMMUNICATIONS IN A TELECOMMUNICATIONS SYSTEM

[75] Inventors: Alexander S. Philip; Mahir Ozdamar; Geoffrey Chopping, all of Dorset, England

[73] Assignee: The Plessey Company, plc, Ilford, England

[21] Appl. No.: 940,365

[22] Filed: Dec. 11, 1986

[30] Foreign Application Priority Data

Dec. 11, 1985 [GB] United Kingdom ................ 8530485

[51] Int. Cl.⁴ .............................................. H04K 1/02
[52] U.S. Cl. ...................................... 380/23; 380/21; 380/25; 380/44; 380/46
[58] Field of Search ............... 380/23, 25, 28, 21, 380/43, 44, 46

[56] References Cited

U.S. PATENT DOCUMENTS

| | | | |
|---|---|---|---|
| 4,369,443 | 1/1983 | Giallanza et al. | 380/25 |
| 4,458,109 | 7/1984 | Mueller-Schloer | 380/23 |
| 4,500,750 | 2/1985 | Elander et al. | 380/23 |
| 4,549,308 | 10/1985 | Lo Pinto | 380/21 |
| 4,578,530 | 3/1986 | Zeidler | 380/24 |
| 4,578,531 | 3/1986 | Everhard et al. | 380/21 |

Primary Examiner—Salvatore Cangialosi
Attorney, Agent, or Firm—Michael F. Oglo; Julian C. Renfro

[57] ABSTRACT

The Telecommunications system includes at least two exchanges and a plurality of user equipments. Each equipment includes a store for holding a user variable data word particular to that user. Each exchange is provided with a store for holding all the user variable data words of the users connected to it, and each exchange is also provided with its own random variable data word. When a first user makes a secure call to a second user, the first user equipment encrypts the call using its particular variable data word and sends the encrypted data to its own exchange. The exchange decrypts the call using the particular user variable data word that will be used for the call. The exchange encrypts the random variable data word with the particular user variable data word and returns it to the first user. The exchange also sends the random variable data word to the second user's exchange which encrypts it with the user variable data word particular to the second user, and sends it to the second user.

4 Claims, 1 Drawing Sheet

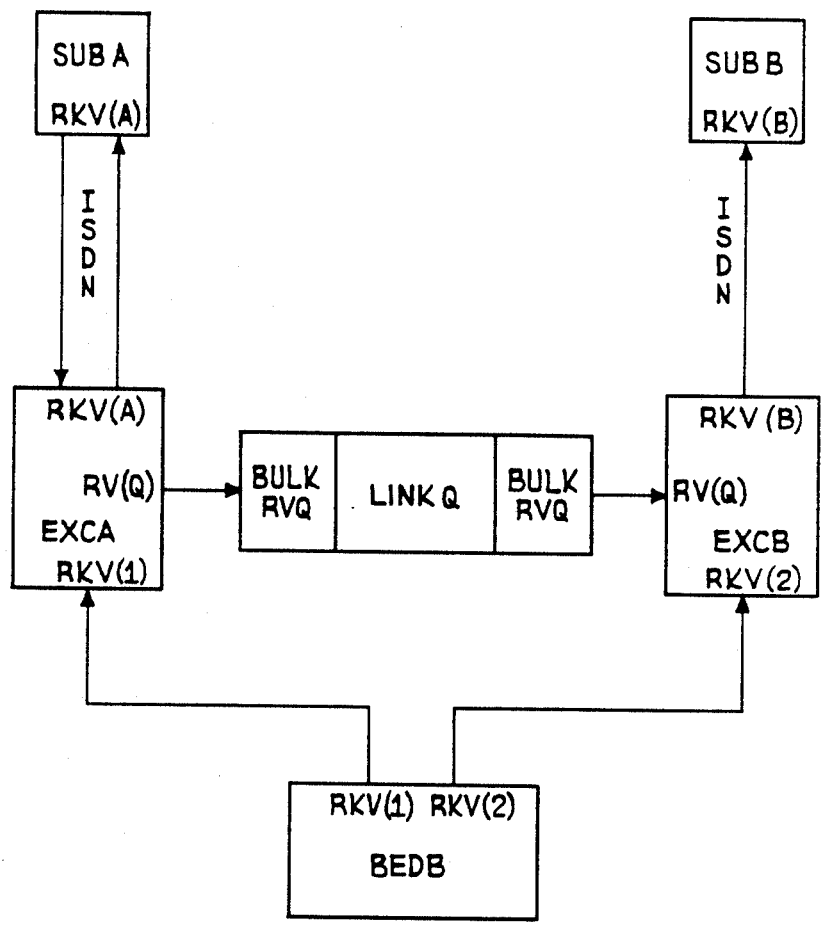

METHOD OF SECURED COMMUNICATIONS IN A TELECOMMUNICATIONS SYSTEM

FIELD OF THE INVENTION

The present invention relates to a method of secured communications in a telecommunications system.

The invention finds application in a public telecommunications system, including System X type exchanges.

There are four main areas where security can be incorporated. The first is the customer facilities which can be used to ensure that the communications are made to the correct subscribers. The second is the encryption of the integrated digital network (ISDN) B and D channels. The third is the encryption of certain signalling messages across the network. The fourth is the bulk encryption of 2048 kbit/s links which will be used to carry all speech (data) and signalling across the modern network. The combination of all these methods gives a very powerful security mechanism.

DESCRIPTION OF THE PRIOR ART

A System X telecommunication exchange already provides some capabilities such as Originating Line Identity (OLI), Terminating Line Identity (TLI), Closed User Group (CUG) and private circuits that provide access verification and some degree of secured access to its ISDN customers. However, these capabilities are not sufficient in themselves to provide really secure communications, and is a disadvantage of known telecommunication exchanges.

SUMMARY OF THE INVENTION

The present invention utilises the outband signalling capabiltties of ISDN subscriber access, and the CCITT No. 7 signalling system. The subscribers do not have to call one another from a different telephone or send codes through the post before making a secure call.

STATEMENT OF INVENTION

According to the present invention there is provided a method of secured communication in a telecommunications system including at least two telecommunication exchanges and a plurality of user equipments, wherein each user equipment is provided with a store which holds a user variable data word particular to that user; and, each exchange is provided with a store which holds all the user variables data words of the users connected to it, and, each exchange is provided with its own random variable data word, so that when a first user makes a secure call to a second user, the first user equipment encrypts the call using its particular user variable data word and sends the encrypted data to its own exchange, the exchange is provided with equipment for decrypting the call using the particular user variable data word and generates the random variable data word that will be used for the call, and encrypts it with the particular user variable data word and returns it to the first user; the exchange also sends the random variable data word to the second user's exchange which encrypts it with the user variable data word particular to the second user and sends it to the second user.

BRIEF DESCRIPTION OF THE DRAWING

An embodiment of the invention will now be described with reference to the accompanying drawing which shows a block diagram of a secure communication telecommuncations system.

DESCRIPTION OF THE PREFERRED EMBODIMENT

Referring to FIG. 1, the user's equipment Sub A, Sub B contains a special chip which holds the subscriber's rekeying variable data word RKVA, RKVB respectively. The rekeying variable data word is a number approximately 100 bits long. The rekeying variable data word can be changed by means of a device that exists. Each exchange also holds the rekeying variable data words of its subscribers. Therefore when the RKV is changed the change must be made both at the user's end and at the exchange.

The random variable data word RV is approximately 200 bits long and is generated by the exchange when required. A random variable data word may be generated once or more than once during a call. However, there are well defined vents that triggers the generation of a new random variable data word.

An example is given below explaining the operation of the proposed method:

When Subscriber A wants to make a secure call to Subscriber B, Subscriber A encrypts his call request with his rekeying variable data word RKVA and sends it to his exchange. Subscriber A's exchange, ExcA decrypts the request using the rekeying variable data word RKVA. Exchange ExcA then generates the random variable data word that will be used in that call, encrypts it with the rekeying variable data word RKVA and sends it to Subscriber A. Exchange ExcA also sends the random variable data word to Subscriber B's exchange ExcB by way of link Q. Exchange ExcB encrypts the random variable data word with the rekeying variable data word RKVB and sends it to Subscriber B. Thus both parties end up with the same random variable data word to be used in that call. The end to end synchronisation is provided by the user's equipment.

The method enables a large degree of flexibility for the users. For instance the user can start with an unsecured call and mid-way through the call may instigate a secure call by virtue of a recall request. Another example would be where the user can start with a secure telephony call and then swap to a secure data call. This is a case where two different random variable data words may be used, one for secure telephony and one for secure data. Another important feature is that the proposed method allows any party involved in a call to request secure communications. Furthermore it is possible to have secure communications in one direction and unsecured communications in the other direction.

Optionally, some of the functions described above may be performed by an external database. In this case the user's rekeying variables data words may be held in the data base and the random variable generated there. In this mode, System X exchanges provide the required signalling and coordination functions.

The method depends heavily on the availability of outband message based signalling systems such as CCITT I-Series between the user and the exchange and No. 7 in the network.

The proposed method can be extended to provide secure signalling across the network. In this case each exchange can have its own rekeying variable and random variables can be periodically issued to exchanges for use in encrypting and decrypting signalling messages. Furthermore it is possible to encrypt only those messages that apply to a secure call.

Bulk Encryption

The bulk encryption database DEDB, sends routine updates of the message random variable data word RV(Q) and the bulk random variable data word RVQ encrypted by the rekeying variable data word RKV(1) to exchange ExcA. Routine updates of the message random variable data word RV(Q) and the bulk random variable data word RVQ encrypted by the rekeying variable data word RKV(2) are also sent to exchange ExcB.

For 2048 kbit/s links between exchanges it is possible to totally encrypt all the speech (data) and signalling, but not the frame synchronisation. The synchronisation patterns and the spare bits in time slot zero are not encrypted so that it is not necessary to know the encryption key to achieve 2048 kbit/s frame synchronisation or to be able to raad the spare bits.

A frame consists of thirty two slots each of eight bits making a total of 256 bits, time slot zero contains a synchronisation pattern in alternate frames. A multiframe consists of sixteen frames which is 4096 bits. The multiframe is signalled by one of the international bits. This international bit and the spare bits are contained in the time slot zero which does not contain a synchronisation pattern. Four spare bits are used to assist with bulk encryption.

There are two factors that both ends of an encryption link need to know. The first is the random variable which defines a pseudo random sequence that will be used to modify the speech (data). The second is to define the position in that sequence so that both ends are in step with one another.

It is necessary to be able to change the random variable data word rountinely without any loss of speech (data) or signalling. This implies that both ends must change at exactly the same instant. One spare bit can be used to indicate when the transmitting interface changes to the new random variable data word so that the receiving end knows when to change over to the new random variable data word. The new random variable data word will have been supplied to both ends independently some time before.

Three spare bits are used to transmit a twenty fuur bit number every multiframe. This is incremented every multiframe. This number will define where the following multiframe is in the sequence. The position of the first bit within a multiframe is of course defined by the synchronisation pattern. It takes over nine hours for the twenty four bit number to repeat.

When a change to a new random variable data word is initiated the spare bit will change state four multiframes before hand. For these four multiframes a new sequence of twenty four numbers can be started to define the position in the sequence of the new random variable data word. If a new random variable data word is not supplied to each end when the spare bit changes then the old random variable data word will remain in use but a jump to the new defined position in the sequence will occur.

The random variable data word can be different for both directions of the 2048 kbit/s links and each link in the country can have its own random variables. The encryption is done prior to the insertion of the synchronisation pattern and spare bits. The encryption circuitry knows when the time slot zero information will be inserted as well as the state of the multiframe timing and twenty four bit number. The decoding is done after the detection of the frame synchronisation, multiframe synchronisation, and the spare bits. The line coding and decoding (HDB3) is performed at the line interfaces.

The present invention can be used in other applications such as in private fixed subscriber networks and in mobile networks. As such, for example, an integrated digital exchange can provide a similar facility for secure communications in a private local or wide area network.

We claim:

1. A method of secured communication in a telecommunications system including at least two communication exchanges and a plurality of user equipments, wherein each user equipment is provided with a store which holds a user variable data word particular to that user; and, each exchange is provided with a store which holds all the user variables data words of the users connected to it, and, each exchange is provided with its own random variable data word, so that when a first user makes a secure call to a second user, the first user equipment encrypts the call using its particular user variable data word and sends the encrypted data to its own exchange, the exchange is provided with decrypting and generation equipment for decrypting the call using the particular user variable data word and generates the random variable data word that will be used for the call, and encrypts it with the particular user variable data word and returns it to the first user; the exchange also sends the random variable data word to the second user's exchange which encrypts it with the user variable data word particular to the second user and sends it to the second user, said decrypting and generation equipment generates a different random variable data word, during communication, to permit the user to change between telephony and data calls.

2. A method of secured communication as claimed in claim 1, wherein the random variable data words are generated in an external data base.

3. A method of secured communication as claimed in claim 1, wherein to provide network signalling, each exchange is given its own variable data word, and random variable data words are periodically issued to exchanges for use in encrypting and decrypting signalling messages across the network.

4. A method of secured communication as claimed in claim 3, wherein a bulk encryption data base is provided which sends updates of a message random variable data word and of a bulk random variable data word to the exchanges.

* * * * *